US011131628B1

(12) United States Patent
O'Rourke et al.

(10) Patent No.: US 11,131,628 B1
(45) Date of Patent: Sep. 28, 2021

(54) SPECTROSCOPIC METHODS AND SYSTEMS FOR ISOTOPIC ANALYSIS

(71) Applicant: SAVANNAH RIVER NUCLEAR SOLUTIONS, LLC, Aiken, SC (US)

(72) Inventors: Patrick E. O'Rourke, Martinez, GA (US); Kimberly Alicia Strange Fessler, Aiken, SC (US); Nicholas F. Deroller, Aiken, SC (US); Steven M. Serkiz, Aiken, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 0 days.

(21) Appl. No.: 16/872,533

(22) Filed: May 12, 2020

(51) Int. Cl.
| | |
|---|---|
| *G01N 21/00* | (2006.01) |
| *G01N 21/39* | (2006.01) |
| *G01N 1/40* | (2006.01) |
| *G01N 21/03* | (2006.01) |
| *G01N 21/25* | (2006.01) |
| G01N 21/31 | (2006.01) |

(52) U.S. Cl.
CPC ........... *G01N 21/39* (2013.01); *G01N 1/4022* (2013.01); *G01N 21/031* (2013.01); *G01N 21/0332* (2013.01); *G01N 21/255* (2013.01); *G01N 2021/3107* (2013.01); *G01N 2021/396* (2013.01)

(58) Field of Classification Search
CPC .. G01N 21/39; G01N 21/3504; G01N 21/031; G01N 33/0006; G01N 33/497; G01N 2021/1704; G01N 21/274; G01J 3/42; G01J 3/427

USPC ....... 356/301, 319, 411, 413, 432, 435, 437; 250/343, 339.13, 345, 339.09, 341.5; 422/83, 91

See application file for complete search history.

(56) References Cited

U.S. PATENT DOCUMENTS

| | | | |
|---|---|---|---|
| 4,329,048 A | 5/1982 | Capitini et al. | |
| 4,535,241 A | 8/1985 | Eberhardt | |

(Continued)

FOREIGN PATENT DOCUMENTS

| | | |
|---|---|---|
| CN | 100378456 | 4/2008 |
| CN | 103728648 | 12/2015 |

(Continued)

OTHER PUBLICATIONS

Amanti, et al. "Low-divergence single-mode terahertz quantum cascade laser" *Nat. Photo.* 3 (2009) 586-590.

(Continued)

*Primary Examiner* — Hoa Q Pham
(74) *Attorney, Agent, or Firm* — Dority & Manning, PA

(57) ABSTRACT

Disclosed are spectroscopy systems and methods. A spectroscopy system can include a reference cell and a multi-pass sample cell. The reference arm can include an etalon and a reference cavity containing a reference gas. A system can include a fractional sublimation cold trap. Detectors of the reference and sample arms can detect both intensity and absorption spectra of impinging beams. A frequency calibration based on a reference absorption spectra can be used to analyze a sample absorption spectrum. The analysis can provide information regarding an absorption band shift of the sample absorption spectrum, said shift being related to the isotope concentration of the sample.

20 Claims, 6 Drawing Sheets

(56) References Cited

U.S. PATENT DOCUMENTS

| | | | | |
|---|---|---|---|---|
| 5,146,294 | A | * | 9/1992 | Grisar .................... G01N 21/39 250/341.5 |
| 5,317,156 | A | * | 5/1994 | Cooper ................... G01N 21/39 250/339.13 |
| 5,550,636 | A | | 8/1996 | Hagans et al. |
| 6,078,049 | A | * | 6/2000 | Schafer ................. G01N 21/274 250/339.09 |
| 6,274,870 | B1 | * | 8/2001 | Kubo ..................... G01N 21/11 250/339.13 |
| 6,444,985 | B1 | * | 9/2002 | Mori ................... G01N 21/3504 250/339.13 |
| 7,063,667 | B1 | * | 6/2006 | Ben-Oren .............. A61B 5/097 600/532 |
| 7,535,006 | B2 | | 5/2009 | Nadezhdinskii et al. |
| 7,697,141 | B2 | * | 4/2010 | Jones ..................... E21B 49/08 356/445 |
| 7,749,436 | B2 | * | 7/2010 | Mori ................... G01N 21/3504 422/54 |
| 7,957,504 | B2 | | 6/2011 | Hill et al. |
| 8,477,304 | B2 | | 7/2013 | Bushaw et al. |
| 8,858,901 | B2 | | 10/2014 | Morel et al. |
| 9,927,420 | B2 | | 3/2018 | Bae et al. |
| 10,234,381 | B2 | * | 3/2019 | Koulikov ............... G01N 21/31 |
| 2015/0276587 | A1 | | 10/2015 | Cowie et al. |

FOREIGN PATENT DOCUMENTS

| | | |
|---|---|---|
| RU | 2317258 | 2/2008 |
| RU | 2325672 | 5/2008 |

OTHER PUBLICATIONS

Bhargava, R. "Infrared spectroscopic imaging: the next generation" *Appl. Spectrosc.* 66 (2012) pp. 1091-1120.

Cox, et al. "IR Spectroscopy of $UF_6$," *Spectrosc. Lett.* 12 (1979) pp. 275-280.

Dubois, et al. "IR Spectroscopy in Clinical and Diagnostic Applications" *Anal. Chem.* 76 (2004) pp. 360A-367A.

Grigor'Ev, et al. "Investigation of $^{235}UF^6$ and $^{238}UF_6$ spectra in the mid-IR range" *Atomic Ener.* 104 (2008) pp. 398-403. (Abstract only).

Grigor'Ev, et al. *Proc. 5th Int'l. Conf. Tunable Diode Laser Spectrosc. TDLS 2005* (2005) p. 159.

IAEA. "International Target Values 2010 for Measurement Uncertainties in Safeguarding Nuclear Materials" *Int'l. Atom. Ener. Agency* STR-368 (2010) pp. 1-41.

Ingle, Jr., et al. "Optical Components of Spectrometers" *Spectrochemical Analysis* Prentice Hall (1988) p. 35. (Abstract Review only).

Nabiev, et al. "Measurements of the isotopic composition of $UF_6$ according to the fine structure of the IR absorption spectrum in the v1 + v3 band" *Rus. J. Phys. Chem. B* 11 (2017) pp. 61-76.

Nasim, et al. "Recent advancements in spectroscopy using tunable diode lasers" *Laser Phys. Lett.* 10:043001 (2013) pp. 1-14.

PSI. IR and Laser-Based Gas Sensors. *Phys. Sci., Inc.* (2020). Web only: www.psicorp.com.

Stanic, et al. "The chemical fingerprint of hair melanosomes by infrared nano-spectroscopy" *Nanoscale* 10 (2018) pp. 14245-14253.

\* cited by examiner

SPECTROSCOPIC METHODS AND SYSTEMS FOR ISOTOPIC ANALYSIS

FEDERAL RESEARCH STATEMENT

This invention was made with Government support under Contract No. DE-AC09-08SR2470, awarded by the United States Department of Energy. The Government has certain rights in the invention.

BACKGROUND

Infrared (IR) absorption spectroscopy is a nondestructive optical technique that detects vibrations and rotations of molecular bonds upon the absorption of infrared light. As different chemical bonds absorb IR light at different quantized frequencies, IR spectroscopy can be used for chemical structure analysis, chemical fingerprinting, and chemical imaging. The unique resonance frequency of a given bond depends on the strength of the bond, the mass of the bound atoms, and the symmetry of the molecule being excited. Due to its unambiguous detection capabilities, IR absorption spectroscopy is an excellent spectroscopic tool for measuring analytes of interest in process facilities.

Facilities that enrich uranium to various grades for energy, medicinal, and defense applications are required to adhere to strict guidelines to ensure nonproliferation of nuclear weapons. The International Atomic Energy Agency (IAEA) is responsible for monitoring enrichment facilities signed onto the treaties that govern enrichment activities. IAEA inspectors need reliable analytical techniques providing high accuracy and sensitivity to measure the level of uranium enrichment processed at facilities. Traditionally, mass spectrometry or radiometric analysis have been used to determine the ratio of uranium isotopes in a sample. Mass spectrometry offers the required accuracy and sensitivity but has been limited to expensive laboratory-based measurements due to the size and complexity of the instrumentation. Often the analysis requires extensive sample preparation, greatly increasing sample analysis time. In contrast, radiometric techniques can be made field-deployable but require large sample sizes and have not demonstrated adequate sensitivity or repeatability.

Improvements in IR laser and detector technologies have dramatically increased the analytical capability of spectroscopic-based quantification techniques, while simultaneously reducing equipment costs, experimental complexity, footprint, and analysis time. These advances have made high performance infrared (HPIR) spectroscopy a potential approach for real-time isotopic analysis of uranium in $UF_6$ gas. Grigor et al. (*Atomic Energy*, 104 (2008) 398-403) demonstrated the determination of uranium isotopes to about 5% accuracy using an infrared spectrometer based on a tunable diode laser at 7.75 microns (1291 cm$^{-1}$ wavenumber). The isotopic shift between $^{238}$U and $^{235}$U is about 0.65 cm$^{-1}$ at the vibrational combination band near 1291 cm$^{-1}$. Nabiev et. al. (*Russian Journal of Physical Chemistry B*, 11 (2017) 61-76) published a study of the $v_1+v_3$ IR absorption band of the $UF_6$ molecule using a quantum cascade laser (QCL) based spectrometer and demonstrated the ability to use QCL technology to determine the isotopic ratio of $^{235}U/^{238}U$ of various isotopic mixtures of $UF_6$ gas at room temperature and moderate pressures (10-70 Torr).

What is needed in the art are systems and methods that can provide improved isotope analysis. Methods and systems that can provide for real-time and high sensitivity measurements of uranium isotopes in the field, e.g., on-site detection at enrichment facilities, that can meet or surpass the IAEA international target values for non-destructive analysis techniques would be of great benefit.

SUMMARY

Disclosed are spectroscopy systems and methods capable of field use that can provide highly accurate isotope detection. A spectroscopy system can include a tunable emission source, e.g., a tunable, narrow wavelength bandpass emission source, and a beam splitter located in a path of the emission source. The beam splitter defines a reference path and a sample path. The system also includes a reference cell in the reference path. The reference cell includes an etalon and a reference cavity, the reference cavity containing a reference gas. A first detector is located at a terminus of the reference path, the first detector being configured to detect an intensity and an absorption spectrum of a reference beam impinging on the first detector.

A spectroscopy system can also include a sample cell in the sample path. The sample cell can be a multi-pass sample cell that includes a plurality of planar face reflectors at opposite ends of the optical cell that are located such that the sample path enters the sample cell and passes back and forth between the opposite ends of the sample cell before exiting the sample cell at an outlet. The sample cell also includes an inlet for a gas sample. The system can include a cold trap for purifying a gas sample prior to the inlet. The cold trap can incorporate a variable temperature control, e.g., a thermoelectric temperature controller, so as to provide controlled purification techniques, e.g., fractional sublimation purification techniques. A second detector is located at a terminus of the sample path, the second detector being configured to detect an intensity and an absorption spectrum of a sample beam impinging on the second detector.

A system can also include a processor in communication with the tunable emission source and the first and second detectors. The processor being configured to perform a frequency calibration based on a reference absorption spectrum obtained by the first detector and, using that frequency calibration, perform an analysis of a sample absorption spectrum obtained by the second detector. The analysis can provide information regarding an absorption band shift of the sample absorption spectrum, said shift being related to the isotope concentration of the sample, e.g., the $^{235}$U and/or $^{238}$U isotope concentration of the sample.

Also described are methods for isotope analysis of a sample. A method can include splitting an emission beam to form a reference beam and a sample beam. The reference beam can be directed through an etalon and through a reference cavity that contains a reference gas and then impinge on a first detector, where an intensity and an absorption spectrum of the reference beam can be detected. Upon detection, the absorption spectrum can be processed to carry out a frequency calibration, which can generate a common frequency scale. The sample beam can be directed through a sample cell that contains a sample gas and then to a second detector, where an intensity and an absorption spectrum of the sample beam can be detected. In one embodiment, the sample cell can be a multi-pass optical cell that includes a plurality of planar face reflectors at opposite ends of the optical cell that are located such that the sample beam enters the sample cell and passes back and forth between the opposite ends of the sample cell before exiting the sample cell at an outlet. A method also includes processing the sample absorption spectrum by use of the common frequency scale to determine an absorbance peak shift of the sample absorption spectrum as compared to a known absorption spectrum. A method can also include analyzing the absorption peak shift to determine an isotope content of the sample.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1:
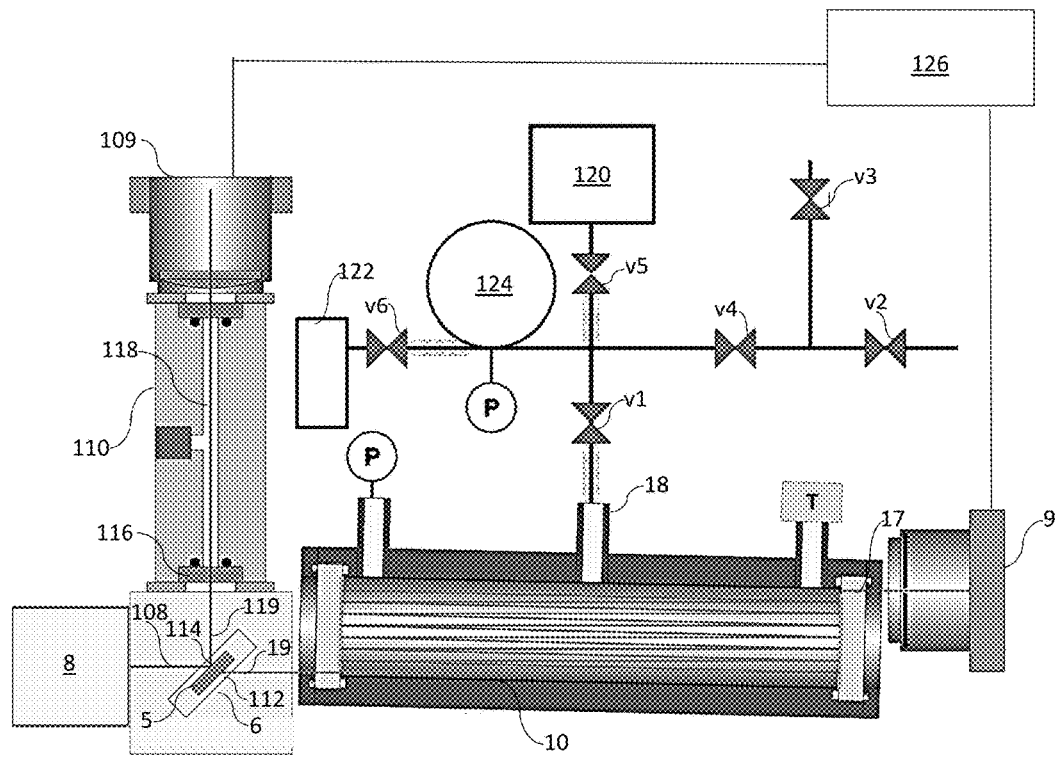
FIG. 1 schematically illustrates one embodiment of a spectroscopic system as described herein.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, disclosed are systems and methods for analyzing isotope content of a gas sample. Disclosed systems can be small and portable while capable of highly sensitive, real-time analysis of a sample. In one embodiment, the systems can provide a field-deployable High Performance Infrared (HPIR) spectrophotometer and associated analysis technique for real-time measurements of uranium isotopes in the gas phase.

The systems can beneficially provide high quality on-site uranium detection at declared enrichment facilities. For instance, disclosed systems and methods can meet or surpass the IAEA international target values for non-destructive analysis when running a relatively few number of scans, e.g., about 10 scans, or about 20 scans for depleted samples, on samples with uranium isotopic content from depleted to highly enriched. The systems can also be very efficient, as one scan can take about 10 seconds, and the system can require only about 20 seconds for data transfer and isotopic prediction output. Beneficially, the analysis technique does not destroy the sample, which allows for further analyses if desired. For instance, a uranium-containing sample can be further analyzed at a designated IAEA lab if the results indicate deviation from declared enrichment activities.

One embodiment of a system is illustrated in FIG. 1. As illustrated, a system can generally include a beam source 8 that can provide a beam emission including the infrared spectrum of interest. By way of example, the beam source 8 source can include a broadly tunable, narrow wavelength bandpass IR laser, a synchrotron light source in the IR range, or another suitable tunable light source. The broadly tunable light source can, for example, be or comprise a quantum cascade laser (QCL) or a plurality of lasers. In one embodiment, the beam source 8 can include a QCL with a tunable wavelength. For instance, a beam source 8 can include a mid-IR QCL. QCLs can offer several advantages over traditional mid-IR sources such as delivering very high spectral power density and delivering very high spatial or angular power density, among other advantages.

The beam source 8 can deliver the emission 108 either directly to a beam splitter 6 or via a suitable delivery channel; for instance, via an optical fiber or other suitable optical channel for transporting an emission 108 to a beam splitter 6. The beam source 8 and/or optical channel can include additional optical elements such as lenses, mirrors, etc. For instance, a beam source 8 can include a collimator or a lens system for generating a substantially collimated, or respectively parallel, or slightly focused emission 108. In one embodiment, a beam source 8 can provide a converging or respectively focused emission 108.

The beam source 8 can supply a broadly tunable emission 108 with a continuous or discrete spectrum that extends over several wavelengths or wavelength ranges of interest. In some embodiments, the system can be designed for use with an expected spectral response in only a small number of absorption bands (e.g., about 20) and/or their relationship with each other. According one such embodiment, the beam source 8 can be designed such that only emission at these relevant absorption bands are supplied, preferably with a specific spectral spread. For instance, a beam source 8 can also include a filter that can filter out predetermined spectral bands from a broadband spectrum. A filter can, for example, be a tunable frequency comb filter, or a dispersive spectrometer with a diffraction grating.

A system can include a beam splitter 6 in optical communication with the beam source 8. At the beam splitter 6, the emission 108 from the beam source 8 can be split to form a reference beam 119 and a sample beam 19. The beam splitter can contain a window 5 that is partially reflective and partially transmissive. In one embodiment, the window 5 can be half reflective and half transmissive so as to split the emission 108 in a 50/50 split. This is not a requirement, however, and in some embodiments, it may be preferred to form a different, non-equal split of the emission 108. For instance, the beam splitter 6 can split the emission 108 from the beam source 8 into a reflected reference beam 119 that carries from about 5% to about 50%, e.g., about 10% of the power of the emission 108 from the beam source 8 and a sample beam 19 that carries from about 50% to about 95%, e.g., about 90% of the power of the emission 108 from the beam source 8. Examples of a beam splitter 6 can include a window comprising zinc selenide (ZnSe), germanium (Ge), gallium arsenide (GaAs), calcium fluoride ($CaF_2$), or combinations of materials as are known in the art (e.g., coatings, etc.). The window of the beam splitter 6 can be held at an angle (e.g., about) 45° with respect to the emission beam line 108. One or both surfaces of the window of the beam splitter 6 can include a coating. For example, one surface can be uncoated and the opposite surface can include an antireflective coating. The beam splitter 6 can include a sample port 112 and a reference port 114 through which the sample beam 19 and the reference beam 119 exit the beam splitter.

A sample beam 19 can pass to a sample cell 10; for instance, by coupling to an optical fiber as is known. Following exit from the sample cell 10, the exiting sample beam 17 can communicate with a sample detector 9. The reference beam 119 exiting the beam splitter 6 at the reference port 114 can likewise be coupled into an optical fiber or utilize another optical communication technique and, after passing through a reference cell 110 including an etalon 116 and a reference cavity 118 (details and examples of which are discussed further herein), can pass to the reference detector 109.

The reference beam 119 can be used to characterize the frequency and intensity of the emission 108 of the beam source 8 simultaneously with the sample beam 19 passage through the sample cell 10. Simultaneous characterization of the emission 108 can be utilized to ensure correct and accurate interpretation of data collected at the sample detector 9. For instance, and without limitation, analysis of a reference beam 119 can be used to account for any fluctuations in the intensity (e.g., intensity drift correction) and to identify mode hops in the emission 108 from the beam source 8, as well as to detect any other issues with the beam source 8. In addition, analysis of data collected at a reference detector 109 can be used to calibrate the wavelength of the reference beam 119, which can then be used to correct (as necessary) a sample spectrum detected at the sample detector 9 obtained from a simultaneous emission 108 of the beam source 8. In one embodiment, a reference spectrum collected at the detector 109 can provide information that can be used to establish the absolute frequency of the emission 108 at discrete points during a scan and provide confidence that frequency interpolation between the points is valid.

In the illustrated embodiment, a reference cell 110 can include an etalon 116 and a reference cavity 118 through which a reference beam 119 can pass sequentially.

The etalon 116 can produce a smooth, periodic amplitude versus wavelength response determined by the physical path length between entrance and exit surfaces of the etalon (i.e., the optical surfaces) and the index of refraction of the medium between the optical surfaces. The free spectral range of an etalon is determined by the optical path length between the optical surfaces and the finesse is determined by the reflectivity of the optical surfaces. The free spectral range and the finesse together determine the bandwidth or selectivity of the individual transmission peaks of the etalon. In one embodiment, the etalon 116 can be a low finesse etalon, but this is not a requirement of a system, and a high finesse etalon can alternatively be utilized. In general, an etalon can give sharp transmission peaks (high Q factor) when the finesse of the device is high while a low finesse etalon can produce broader transmission peaks (lower Q factor).

As a reference beam 119 is directed through the etalon 116, the transmitted intensity of the reference beam 119 can be modified by interference with an internally reflected beam within the etalon 116. The intensity modification is dependent on frequency of the emission 108, etalon width, index of refraction, angle of incidence, and surface reflectivity according to the relationship:

$$\text{Transmission} = [1-R]^2 / [1+R^2 - 2R \cos(4\pi W n \eta)]$$

in which:
R is surface reflectivity of the etalon (e.g., 0.171 for ZnSe at normal incidence)
W is etalon width in cm
n is index of refraction (=2.41 for ZnSe}
$\eta$ is the reference beam frequency expressed in wavenumber In one embodiment, the etalon 116 can be a monolithic etalon. In other embodiments, the etalon can include two plates, optionally separated by a spacer (e.g., a dielectric stack). One or more surfaces of an etalon plate can be coated (e.g., up to about 10 micrometer coatings); for instance, with a partially reflecting layer as is known in the art. By way of example and without limitation, in one embodiment, a monolithic zinc selenide (ZnSe) etalon can be utilized in which the entrance window can be uncoated and the exit window can include an antireflective (AR) coating. An etalon is not limited to ZnSe, and other materials suitable for use in the IR spectrum of interest can be utilized either alone or in combination with other materials including, without limitation, sapphire, calcium fluoride, barium fluoride, etc.

In one embodiment, the etalon 116 can be fixed, and this may provide a simpler device and improve the portable capabilities of the device. This is not a requirement, however, and in other embodiments, etalon 116 may be tunable. An etalon can be made tunable by varying the spacing between the optical elements, changing the refractive index of the medium between them, or a combination of these approaches. Temperature tuning, usually carried out by mounting heating/cooling elements on the etalon and controlling the temperature through a control loop, can operate to both change the refractive index of the optical medium, if the medium is not a vacuum, as well as changing the physical path length through thermal expansion of the materials used to separate or enclose the optical surfaces. Voltage tuning and piezoelectric tuning approaches can also be used. Temperature control, where the etalon is held at a constant temperature, is also useful in stabilizing the performance of the etalon, holding it to a controlled temperature.

Following passage of a reference beam 119 through an etalon 116, the etalon modified reference beam 119 can then travel through a reference cavity 118, which contains a reference gas that absorbs portions of the reference beam 119 at very specific frequencies according to the Beer-Lambert law:

$$\log_{10}(\text{Transmission}) = -\varepsilon(\eta) * L * c$$

in which:
$\varepsilon(\eta)$ is the frequency dependent molecular absorption cross-section
L is the reference cavity path-length in cm
c is the reference gas concentration in molecular density The size of the reference cell is not particularly limited, and can be relatively small for use in portable systems. For instance, in one embodiment, the path length of the reference beam 119 through the reference cavity 118 can be from about 10 to about 50 mm; for instance, about 50 mm in some embodiments; and the volume of the reference cavity 118 can be from about 70 microliter to about 500 microliter; for instance, about 400 microliters in one embodiment. In one embodiment, the reference gas in the reference cavity 118 can be at a pressure of about 1 millibar. For instance, the reference gas can be contained in the reference cavity 118 at a concentration of about $1 \times 10^{-3}$ bar partial pressure or from about $2 \times 10^{16}$ molecules/cc to about $3 \times 10^{16}$ molecules/cc; for instance, about $2.69 \times 10^{16}$ molecules/cc in some embodiments.

The reference cavity 118 can be filled with a gas exhibiting a manifold of narrow absorption lines whose absolute frequencies are well known. In one embodiment, the reference gas can include nitrous oxide ($N_2O$). The reference gas is not limited to $N_2O$, however, and other reference gases as are known in the art may alternatively be utilized including, without limitation, methane, acetylene, hydrogen cyanide, hydrogen iodide, carbon monoxide, or water. A reference gas may include a combination of two or more gases. In one embodiment, the reference cavity 118 may also contain a carrier gas. For example, a reference cavity 118 may include a combination of methane and acetylene, or acetylene and a carrier gas such as argon or nitrogen.

Upon passing through the etalon 116 and the reference cavity 118, the reference beam 119 can be directed to a detector, e.g., via direct optical connection or by coupling to an optical fiber, as is known. The reference detector 109 can be a detector suitable for the spectra of interest as is known in the art, e.g., onto a mercury cadmium telluride (MCT) detector or another suitable low-noise photo-voltaic device with MHz frequency response.

The sample beam 19 formed at the beam splitter 6 can be directed to a sample cell 10. As illustrated in more detail in FIG. 2, a sample cell 10 can be a multi-pass cell and include a cavity 11 defined between a first end 12 and a second end 14. In one embodiment, sample cell 10 can have a relatively small volume cavity 11, which can be beneficial in forming smaller, portable systems and when the sample may be hazardous or highly valuable. For instance, cavity 11 can define an interior volume of less than 500 mL, which is the volume of a typical low-volume IR spectroscopy cell. In some embodiments, cavity 11 can define a volume of about 450 mL or less, about 400 mL or less, about 350 mL or less, about 300 mL or less or about 250 mL or less or about 1 mL or more, about 2 mL or more, about 3 mL or more, or about 5 mL or more, such as from about 1 mL to about 100 mL, or about 5 mL to about 50 mL, in some embodiments. A multi-pass sample cell 10 can likewise have small external dimensions, e.g., a length of from about 50 mm to about 200 mm, or about 100 mm in some embodiments, and a cross-sectional dimension of from about 10 mm to about 50 mm; for instance, about 20 mm in some embodiments.

A sample cell 10 can include a beam inlet 13 and a beam outlet 15 and can define a beam path 16 passing from the inlet 13 to the outlet 15. During use, a sample beam 19 can pass into the cavity 11 of the cell 10 via the inlet 13, and the beam can then proceed along the beam path 16 where exiting beam 17 exits at the outlet 15. As shown, an incident beam 19 can enter the cell at the inlet 13 through the first end 12, pass to the second end 14 of the cell along pass 1 across the length L of the cell cavity 11, where it can be reflected and travel back to the first 12 end along pass 2, where it will be again reflected and travel back to the second end 14 along pass 3, and so on over the entire path length 16 to the outlet 15, where the exiting beam 17 can be communicated to a sample detector 9.

Figure 3:
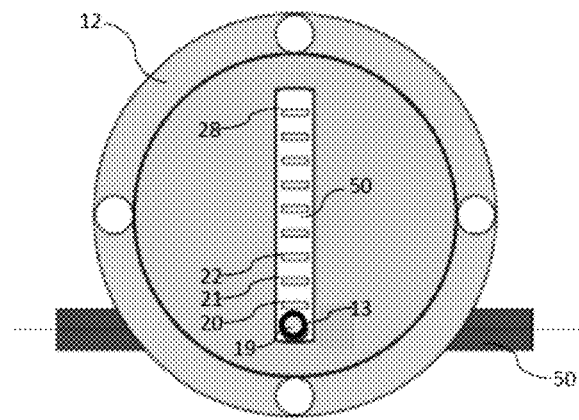
FIG. 3 schematically illustrates a first end of a multi-pass sample cell as illustrated in FIG. 2.

To provide the long path length a sample cell 10 can include a plurality of discrete planar reflectors deposited on each end 12, 14 of the cavity 11. As indicated in FIG. 3, cavity end 12 can include a series of discrete planar reflectors 20, 21, 22, etc., 28 that are separated from and aligned with one another and, as indicated in FIG. 3, cavity end 14 can include a series of discrete planar reflectors 30, 31, 32, etc., 37, 38 that are separated from and aligned with one another. In addition, the two sets of planar mirrors on each end 12, 14 are separated from one another across the length L of the cell cavity 10 so as to face one another.

Each reflector has a reflection face facing into the cell cavity that is formed from a material that provides suitable reflection of an incident beam 19. The preferred material for the reflection faces of the reflectors can generally depend upon the nature (e.g., wavelength) of the energy beam used in a protocol. While the reflection face of each reflector can be highly reflective (i.e., reflect about 90% or more of the incident energy), this is not a requirement of the reflectors, and the term "reflection" is not limited herein to a particular high degree of reflection, or, similarly, to a low degree of absorption or transmission. For instance, in some embodiments, it may be acceptable for a reflector to exhibit a degree of reflection of only about 50%. In one embodiment, each reflection face of each reflector 20, 30, etc., can include a metal deposit, e.g. made by vacuum deposition, chemical vapor deposition, or any other suitable technique, of suitable metals including noble metals, such as gold, platinum or alloys, or by precipitation of silver, covered or not by a protective layer, as well as highly polished surfaces of metals, such as silver, noncorrosive steel, gold and other noble metals.

The reflection face of each reflector 20, 30, etc., can be planar, i.e., a reflection surface in which the angle of incidence of the reflection face is equal to (or substantially equal to) the angle of reflection. Planar quality in optics is typically specified in reference to a standard optical flat in terms of interference waves. In one embodiment, each planar reflector 20, 30, etc. can exhibit less than ¼ wave distortion in a reflected beam.

Figure 4:
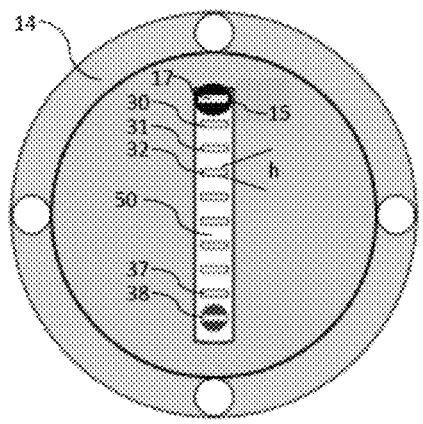
FIG. 4 schematically illustrates a second end of a multi-pass sample cell as illustrated in FIG. 2.

As illustrated, a set of reflectors can be mounted on each end 12, 14 of the optical cell cavity with the individual reflectors of each set spaced apart from one another, and the reflection faces of all of the reflectors at both ends of the cavity parallel to one another. In addition, the reflectors of each end are held in alignment with one another and the two reflector sets are aligned with one another. For example, as illustrated in FIG. 3 and FIG. 4, a first set of reflectors 20, 21, 22, etc., 28 can be located on the first end 12 of a cell cavity such that they are spaced apart from one another and aligned with one another across the end 12; for instance, across a diameter of a circular end 12 as illustrated. In addition, a second set of reflectors 30, 31, 32, etc., 37, 38 can be mounted on the second end 14 of the sample cell cavity 11 such that they are spaced apart from one another and aligned with one another across the end 14. The alignments of the reflectors at each end of the cell correspond with each other, e.g., when the reflectors 20, 21, 22, etc. are aligned across a diameter of the end 12, the reflectors 30, 31, 32, etc. are aligned across the same diameter of the end 14. In addition, the spacing between adjacent reflectors in both reflector sets can be equivalent to one another.

The individual reflectors at each end 12, 14, are located with respect to one another such that during use a sample beam 19 can enter the cell at the inlet 13 and be reflected back and forth across the cell passing from reflector to reflector until the exiting beam 17 exits the cell at the outlet 15.

In one embodiment, each reflector can be surrounded by a substrate 50 (alternately referred to herein as a window) that is transparent to one or more wavelengths of a sample beam 19. For instance, ZnSe can be utilized, as it is known for low absorptivity at infrared wavelengths and high transmission in the visible spectrum. Other materials known for formation of IR transparent windows and the like can alternatively be utilized including, without limitation, zinc sulfide (ZnS), germanium (Ge), and gallium arsenide (GaAs). Coatings may be employed on either or both faces of a substrate 50 to enhance chemical inertness and/or to reduce reflection at either surface of the substrate 50 (i.e., interior or external surfaces of a substrate 50).

Figure 2:
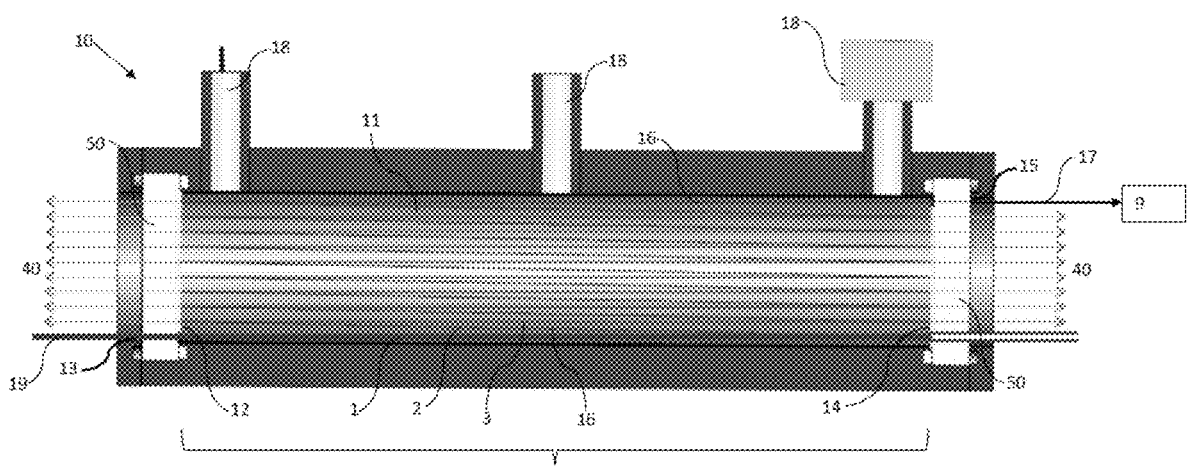
FIG. 2 schematically illustrates a multi-pass sample cell as may be incorporated in a system.

As schematically illustrated in FIG. 2, as a sample beam passes 19 along the beam path 16 back and forth through the cavity 11, divergent energy 40 from the beam can pass through the transparent substrate 50 at either end 12, 14 of the cavity 11.

To increase the probability that divergent light from a sample beam will pass through the transparent substrate 50 as it passes along the beam path 16 rather than be reflected and remain in the cavity 11, the height of each reflector h, i.e., as determined in the alignment direction, can be smaller than the center-to-center distance between adjacent reflectors. For instance, the height h of and individual reflector can be about ⅓ or less of the center-to-center distance between that reflector and an adjacent reflector, and the center-to-center distance between adjacent reflectors can be about 10 mm or less; for instance, from about 1 mm to about 6 mm, or from about 2 mm to about 4 mm in some embodiments. The width of each reflector, i.e., that dimension normal to the alignment direction of the reflectors, is not particularly limited, and can vary depending upon costs, overall cell dimensions, input beam diameter, etc. In general, all of the reflectors can be the same as one another in dimensions and spacing between adjacent reflectors and between the inlet and outlet and their respective adjacent reflectors on each end can also be the same.

To further improve the signal-to-noise ratio of a system, the reflectors of a beam path can be located so as to provide a unique transmission path through the cavity. A unique transmission path can be obtained by including a beam path formed of a prime number of passes through the sample cell 10 from the inlet 13 to the outlet 15. For any prime number of passes (1, 2, 3, 5, 7, 11, 13, 17, 19, 23, etc.), there will be a unique transmission path through the cavity. For other than a prime number of passes, overlapping transmission paths can exist for all factors of the total number of passes.

Figure 5:
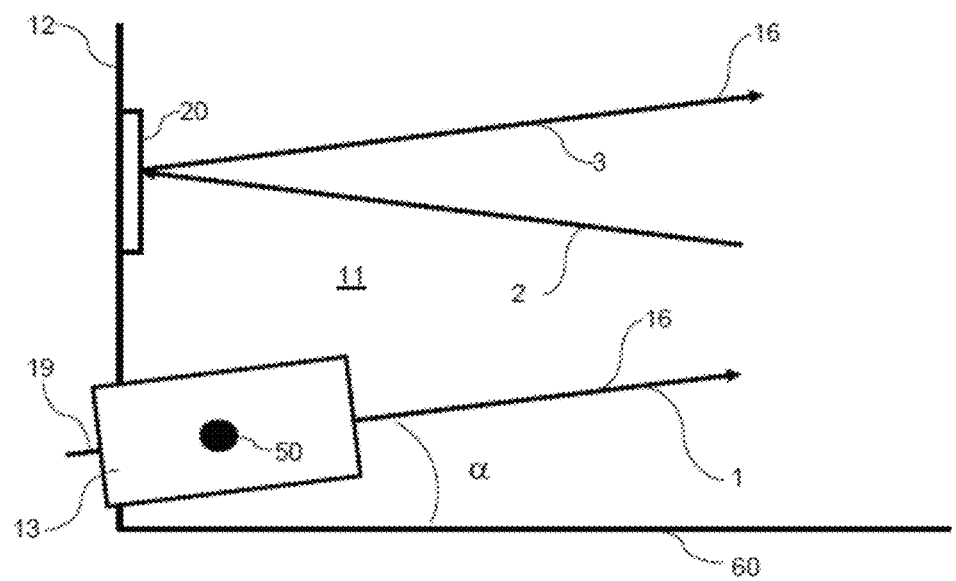
FIG. 5 schematically illustrates a sample beam inlet area of multi-pass sample cell as illustrated in FIG. 2.

FIG. 5 provides a more detailed view of the area of a sample cell including a beam inlet 13 to a cavity 11. In order to reflect off of the planar mirrors in the cell (one example of which 20 is illustrated on the end 12 of the cell in FIG. 5) and progress through the optical cell along pass 3 of the beam path 16, the beam inlet 13 can describe an angle α to the cavity wall 60, which can in turn can be normal to the end 12 and to the plane of the reflection face of each reflector (e.g., 20) held at either end of the cavity 11.

Beam angles reflected off of end 12 along the beam path 16 are always parallel the primary beam of pass 1, and reflected beam angles off of end 14 are always at an angle of 180°-2α. For an odd number of passes through the sample cell 10, the exiting beam 17 is parallel with the primary beam pass 1 but displaced by a distance H across a height of the sample cell. The beam displacement and cell tilt angle are related to the physical parameters of the cell through the following equations:

$$\alpha = \mathrm{ArcTan}(D/(L*N_p))$$

$$H = D*\cos(\alpha)(N_p-1)/N_p$$

in which:
L is the physical cavity length
D is the beam displacement within the cell
$N_p$ is the number of passes through the cell
Other useful values of a sample cell 10 can include:
Path length=$(L*N_p)/\cos(\alpha)$
Reflector separation=$2D/N_p$
Reflector distance from center, $D_k=(2k-1)*D/N_p-D/2$ $\{k|k=1,2, (N_p-1)/2\}$ Referring again to FIG. 1, following exit from the sample cell 10, the exiting beam 17 can be directed to a sample detector 9. While not required, the sample detector 9 can be a detector suitable for the spectra of interest as is known in the art. In general, the reference detector 109 and the sample detector 9 can be the same type of detector, e.g., onto a mercury cadmium telluride (MCT) detector or another suitable detector, examples of which are discussed above with regard to the reference detector 109.

The sample cell 10 can include one or more access ports 18, as indicated in FIG. 1 and FIG. 2. Access ports 18 can be utilized for control systems, e.g., pressure detectors, temperature detectors, etc. In addition, at least one access port 18 can be used to deliver and remove a sample into/from a sample cell 10. Optionally, a first access port can be used to deliver a sample to sample cell 10, while a different access port can be used to evacuate a sample from sample cell 10.

A system can include a cold trap 120 as part of the gas manifold to allow for purification of a gas to be delivered to a sample cell 10. For instance, a gas source 122 can be in fluid communication with a cold trap 120 via one or more valves, v5, v6, and the cold trap 120 can be used to purify a gas of interest contained in the gas source 122 prior to delivery of the purified gas to the sample cell 10.

In one embodiment, a sample can be introduced into the sample cell 10 by closing valve v6 and evacuating the sample cell 10, cold trap 120, and sample loop 124. When vacuum is achieved (e.g. about 0.01 torr or less), the sample loop 124 can be isolated by closing valves v1, v4, and v5, then allowing a sample gas to fill the sample loop 124 by opening valve v6. When there is sufficient pressure in the sample loop 124, (typically about 70 torr) valve v6 can be closed and the sample can be introduced into the sample cell 10 by opening valve v1. The final pressure in the sample cell 10 can typically be about 80% of the initial sample loop pressure.

If sample purification is desired, valve v5 can be opened and the gas sample can be condensed in the cold trap 120. For instance, when purifying a $UF_6$ sample for determination of uranium isotope content of the sample, a cold trap 120 can generally be operated at temperatures below about 225K where the partial pressure of $UF_6$ is less than 0.2 torr. At the operation temperature, the material in the cold trap 120 can be cooled to a sufficiently low temperature to freeze and solidify the gas sample on the surfaces of the cold trap 120.

Common impurities having vapor pressures higher than $UF_6$ can then be removed by sublimation of the impurities by opening vacuum isolation valves v2 and v4 and pumping the system, thereby withdrawing impurities from the cold trap 120 while maintaining the UF$_6$ below the sublimation point. The purified sample can then be reintroduced into the manifold by closing the vacuum isolation valves v2 and v4 and allowing the cold trap 120 to warm to room temperature.

As with traditional transmission infrared absorption spectroscopy systems, the fundamental physics governing the absorption of a reference gas and a sample gas is defined by the Beer-Lambert law:

$$A(v)=-\log T(v)=\varepsilon(v)bc$$

in which:
A is absorption,
T is transmission,
ε is molar absorptivity (L/mol·cm),
b is pathlength (cm), and
c is concentration (mol/L).

To generate a transmission spectrum, the emission frequency is scanned over a set range (e.g., 25 cm$^{-1}$) at a set rate (e.g., 2.5 cm$^{-1}$/sec). A sample beam 19 transmitted through the sample cell 10 and a reference beam 119 transmitted through the reference cell 110 are simultaneously measured (e.g., at 10 kHz frequency) by sample and reference detectors 9, 109, respectively. Data can be collected from the detectors at sufficient density to allow accurate peak determination of the absorption lines. Typical measurement density can be greater than seven points across the full-width-at-half maximum of the narrowest spectral feature.

To provide the high accuracy results of the system, a channel-to-frequency calibration can be derived for each scan. To carry out the channel-to-frequency calibration, as well as additional data manipulation described further herein, a system can also include a computer system 126 that is in communication with the detectors. In some embodiments, the computer system 126 can be in communication with other components of a system as well, as would be evident to one of skill in the art. A computer system 126 can be configured to manipulate input data from the detectors so as to analyze a reference signal 119 collected at the reference detector 109 and apply that analysis result to sample data collected at the sample detector 9 to determine the isotope content of a sample.

A computer system 126 can include one or more processors and a memory. The processor(s) can include any known processing device. Memory can include any suitable computer-readable medium or media, including, but not limited to, RAM, ROM, hard drives, flash drives, or other memory devices. The memory can be non-transitory. Memory stores information accessible by processor(s), including instructions that can be executed by processor(s). The instructions can be any set of instructions that when executed by the processor(s), cause the processor(s) to provide desired functionality. For instance, the instructions can be software instructions rendered in a computer-readable form. The memory can store information accessible by processor(s), including instructions that can be executed by processor(s). The instructions can be any set of instructions that, when executed by the processor(s), cause the processor(s) to provide desired functionality. Memory can further store data. Data can be any form of data, including reference data for use in a protocol (e.g., reference gas spectral data; isotope ratio comparison data, etc.) that can be stored for later transmission or utilization.

When software is used, any suitable programming, scripting, or other type of language or combinations of languages may be used to implement the teachings contained herein. Alternatively, the instructions can be implemented by hardwired logic or other circuitry, including, but not limited to, application-specific circuits. Memory can also include data that may be retrieved, manipulated, or stored by processor(s).

A system can include a network interface for accessing information over a network. The network can include a combination of networks, such as Wi-Fi network, LAN, WAN, the Internet, cellular network, and/or other suitable network and can include any number of wired or wireless communication links. For instance, computing system 126 could communicate through a wired or wireless network.

Data manipulation can include frequency calibration of the reference signal 119 for each scan. This frequency calibration process can provide a common frequency scale that can then be utilized in interpolation of a sample absorption spectra collected by the sample detector 9. In general, a calibration process can include carrying out analyses of data from reference detector 109 in order to identify and map characteristic atomic emissions of the reference gas (e.g., as may be stored in a memory of computer system 126) to particular responses of the reference detector 109. This mapping can allow for corrections that can then be applied during sample processing to convert the sample data from the sample detector 9 to the common frequency scale developed by the frequency calibration of the reference data from the reference detector 109. The processor can then determine a sample absorbance spectrum during sample processing by comparing the corrected raw data at identical wavelengths from the sample detector 9.

By way of example, a frequency calibration can be performed by assigning the known frequencies of reference gas absorption lines (e.g., N$_2$O absorption lines) to corresponding channel positions of absorbance peaks measured in the reference arm of a system. The method identifies the narrow absorption lines and assigns absolute frequencies to those discrete points in the spectral scan according to the known frequencies of the gas. Frequencies of the remaining points in the reference spectrum can then be assigned by interpolation if the etalon pattern verifies that the spectral scan between the discrete points is continuous.

By way of example, Table 2, below, provides a list of the N$_2$O rovibrational lines used as may be used for a calibration for examination of a uranium-containing sample in the 1157 cm$^{-1}$ range (v$_2$+v$_3$) [scan range 1145 cm$^{-1}$ to 1170 cm$^{-1}$] and the 1291 cm$^{-1}$ range (v$_1$-v$_3$) [1280 cm$^{-1}$ to 1305 cm$^{-1}$].

TABLE 1

| Transition J | 0200-0000 cm$^{-1}$ | Estimated Channel | Transition J | 1000-0000 cm$^{-1}$ | Estimated Channel |
|---|---|---|---|---|---|
| −28 | 1145.3303 | 694 | −5 | 1280.6776 | 1042 |
| −27 | 1146.1230 | 3992 | −4 | 1281.5296 | 4462 |
| −26 | 1146.9172 | 7290 | −3 | 1282.3779 | 7862 |
| −25 | 1147.7128 | 10612 | −2 | 1283.2249 | 11250 |
| −24 | 1148.5094 | 13796 | −1 | 1284.0652 | 14608 |
| −23 | 1149.3077 | 17116 | 1 | 1286.5689 | 24584 |
| −22 | 1150.1078 | 20480 | 2 | 1287.3960 | 27870 |
| −21 | 1150.9096 | 23900 | 3 | 1288.2197 | 31138 |
| −20 | 1151.7125 | 27120 | 4 | 1289.0408 | 34392 |
| −19 | 1152.5172 | 30314 | 5 | 1289.8570 | 37620 |
| −18 | 1153.3234 | 33588 | 6 | 1290.6701 | 40834 |
| −17 | 1154.1313 | 36864 | 7 | 1291.4808 | 44032 |
| −16 | 1154.9405 | 40098 | 8 | 1292.2861 | 47204 |
| −15 | 1155.7517 | 43176 | 9 | 1293.0892 | 50364 |
| −14 | 1156.5648 | 46430 | 10 | 1293.8880 | 53502 |
| −13 | 1157.3792 | 49642 | 11 | 1294.6842 | 56624 |
| −12 | 1158.1956 | 52998 | 12 | 1295.4764 | 59728 |
| −11 | 1159.0140 | 56202 | 13 | 1296.2642 | 62810 |
| −10 | 1159.8338 | 59368 | 14 | 1297.0487 | 65874 |

TABLE 1-continued

| Transition J | 0200-0000 cm$^{-1}$ | Estimated Channel | Transition J | 1000-0000 cm$^{-1}$ | Estimated Channel |
|---|---|---|---|---|---|
| −9 | 1160.6555 | 62740 | 15 | 1297.8309 | 68926 |
| −8 | 1161.4789 | 65830 | 16 | 1298.6084 | 71956 |
| −7 | 1162.3043 | 69094 | 17 | 1299.3831 | 74970 |
| −6 | 1163.1313 | 72296 | 18 | 1300.1527 | 77960 |
| −5 | 1163.9592 | 75380 | 19 | 1300.9211 | 80940 |
| −4 | 1164.7906 | 78636 | 20 | 1301.6838 | 83896 |
| −3 | 1165.6235 | 82010 | 21 | 1302.4444 | 86840 |
| −2 | 1166.4580 | 85200 | 22 | 1303.2005 | 89760 |
| −1 | 1167.2944 | 88338 | 23 | 1303.9535 | 92666 |
| 0 | 1168.9722 | 94744 | 24 | 1304.7025 | 95554 |
| 1 | 1169.8138 | 97960 | 25 | 1305.4483 | 98424 |

Absorbance line channel locations in the reference spectrum can be identified by examining the slope and curvature of the spectral signal. Quadratic spline fit coefficients can be calculated for each channel number over a given range of channels and sharp absorbance signals can then be identified through examination of the first and second order coefficients, which are related to the slope and curvature of the spectral signal. The range of channels is typically chosen to match the half-width of the reference gas lines (e.g., about 7 channels). In effect, the spline fit is a transformation from discrete data measurements, A(n), to a piece-wise continuous data representation, A(n+η):

$$A(n+\eta)=C_0(n)+C_1(n)*\eta+C_2(n)*\eta^2 \ \{|\eta|<=\eta<=0.5\}$$

in which:
A is the piece-wise continuous absorbance representation,
n is a channel integer between 1 and 100,000,
η is a real number between +/−0.5, and
$C_0(n)$, $C_1(n)$, $C_2(n)$ are the calculated quadratic fit coefficients at channel n.

In one embodiment, the coefficients of the spline fit transformation can be computed in an Excel® macro known in the art entitled "SplineFit".

Sharp absorbance peak locations can be identified in the reference spectrum at first derivative zero crossings, which are identified using the $C_1$ channel coefficients, by searching for values $C_1(n)>0$ where $C_1(n+1)<0$. A peak channel value is assigned as $[m-C_1(m)/(2*C_2(m))]$ where m is the integer that gives a local minimum of $|C_{24}(m)|$ for {ml n, n+1}. In practice, channel assignments for rovibrational lines vary as much as +/−500 from expected values. If any peak assignments fall outside of this range, the spectrum can be rejected and not processed further. In one embodiment, the peak channel values can be determined and frequencies assigned by use of an Excel® macro known in the art entitled "Peak_Find". Rovibrational peak assignment results in a table of discrete channel values and their frequencies. Full channel to frequency assignment can be made by linear interpolation:

$$f(n)=F_i+(F_j-F_i)/(j-i)*(n-i) \ \{n|i<n<j\}$$

in which:
f(n) is the frequency at channel n
i and j are channel numbers assigned to adjacent rovibrational lines
$F_i$ and $F_j$ are the known rovibrational frequencies With each channel assigned a frequency value by processing the reference spectrum, the sample spectrum can then be quadratically interpolated to the uniform and evenly spaced frequency values of the common frequency scale; for instance, by use of an Excel® macro known in the art entitled "Interpolate" using the set of calculated Ck coefficients.

Interpolation of the sample spectra to a common frequency scale allows sample spectra to be compared using point-by-point arithmetic operations. Operations performed on interpolated spectra can include comparison operations as well as clean-up operations such as, for example, Fourier filtering, blank subtraction, mean centering, and signal normalization. Such operations can be carried out to clean up raw spectral data via, e.g., spectra smoothing and background subtraction/correction, as well as to extract the desired absorbance data from the sample spectra. For instance, a data analysis method can include spectra smoothing, spectra centering, baseline correction, area-normalization, and spectral feature detection. Spectra can be modified with smoothing and spectra area normalization functions and data reduction can be utilized to extract the parameters of interest.

In those embodiments in which sample spectra are processed using fast-Fourier algorithms, the number of points in the interpolated spectrum can be chosen to be an integer power of 2. Fourier filtering can be used to suppress interference and etaloning effects found in sample spectra. The processing sequence can be, e.g., Fourier transformation, high-frequency suppression (Fourier coefficients N>23 set to zero), and inverse-Fourier transformation of the suppressed data.

Figure 8:
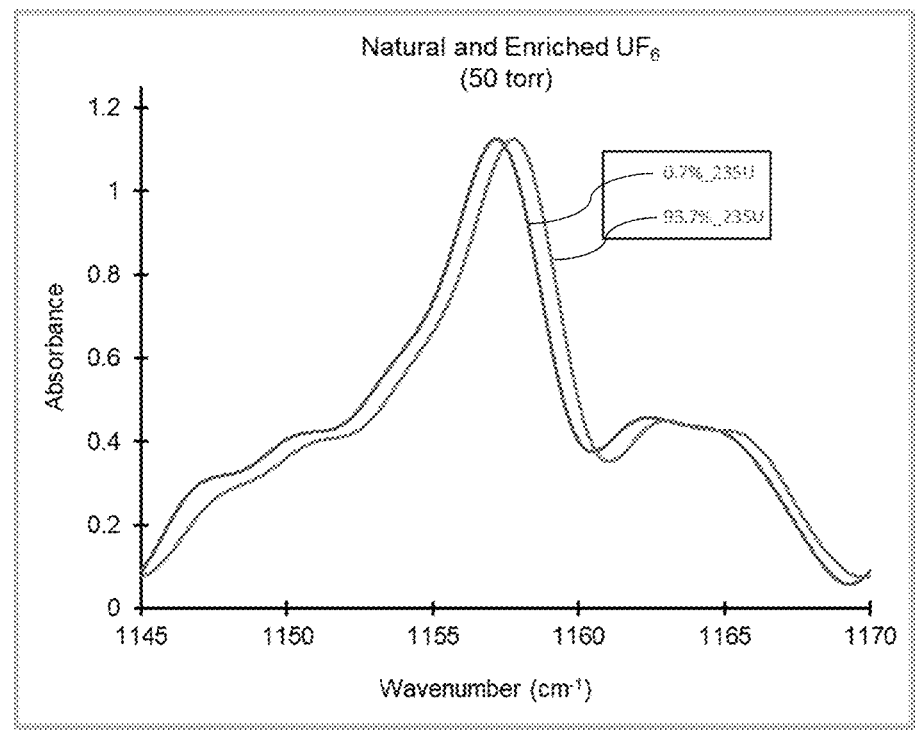
FIG. 8 provides IR absorbance spectra of $UF_6$ demonstrating the wavenumber shift from natural $UF_6$ (0.7% $^{235}U$) to highly enriched $UF^6$ (93.7 $^{235}U$).

In the disclosed methods, the isotope concentration of a sample can be identified through highly accurate determination of the absorption bands of a sample and recognition of a shift in absorption band location depending upon the isotope content of the sample. For $UF_6$ enrichment, the concentration of interest is the isotopic content of $^{235}U$ and $^{238}U$. The disclosed methods utilize the knowledge that the IR absorption band of the $v_1+v_3$ $^{235}U$ band around 1291 cm$^{-1}$ is shifted by about 0.65 cm$^{-1}$ from that of $^{238}U$. The $v_2+v_3$ absorption band at about 1157 cm$^{-1}$ displays similar uranium isotope shift. FIG. 8 illustrates the shift of the 1157 cm$^{-1}$ absorbance band of $UF_6$ as a function of $^{235}U$ content.

To determine isotope content of a sample, disclosed methods develop a model as a linear combination of multiple components, each component representing some aspect of absorbance due to an isotope. For instance, in the example of uranium isotope analysis, a method can develop a linear combination of three components, absorbance due to $^{235}U$, absorbance due to $^{238}U$, and background absorbance. Since pure spectra for $^{235}U$ and $^{238}U$ cannot be measured, a principal component regression model (also referred to herein as principal component analysis or PCA) can be used to determine the contribution of one of the isotopes, e.g., the $^{235}U$ contribution, to each spectrum.

PCA is a mathematical procedure that utilizes an orthogonal transformation to convert a set of observations of possibly correlated variables, such as the set of vectors representative of a plurality of parameters that identify the contribution of a particular isotope to an absorption band, to a set of values of linearly uncorrelated variables termed principal components. The number of principal components is less than or equal to the number of original variables. The transformation is defined so that the first principal component has the largest possible variance and each succeeding component has, in turn, the highest variance possible under the constraint that it be orthogonal to, that is, uncorrelated with, the preceding components.

According to one embodiment of the disclosed methods, a PCA may be performed on vectors representative of absorption band locations of a spectrum to determine contribution of each isotope to the absorption band location. For example, the feature space may include vector representations of $^{235}$U content, $^{238}$U content, and total U content with regard to peak absorption bands of an absorption spectrum. In this embodiment, a computer system as described above may be configured to transform the vector representations of all the parameters to a smaller dimensionality set of constituent features describing the greatest variation in the underlying data, i.e., a first principal component, a second principal component, etc. The analysis can thus provide a plurality of PCA spaces, each of which represent contribution of one of the isotopes or total element content to peak location of an absorption spectrum. The PCA space describing the contribution of each isotope to the location of each absorption peak can then be utilized in a comparison analysis with an unknown sample. Through utilization of a multivariate analysis method such as PCA, the comparison analysis used to identify an isotope content can be much more straight forward as compared to an analysis that utilizes the underlying data of the sample, and can still provide high confidence identification results.

Disclosed systems and methods can provide analytical test results that can meet or surpass the IAEA international testing values for non-destructive analysis for samples with isotopic content of depleted to highly enriched. As such, the disclosed HPIR systems and methods can be used for onsite, real-time detection at greater sensitivity than traditional non-destructive analysis analytical techniques.

The present disclosure may be better understood with reference to the Example set forth below.

Example

A system as schematically illustrated in FIG. 1 was used. The wavelength discrimination was achieved using a tunable, mode-hop-free, QCL operating near 8.6 μm or 7.75 μm (CW-MHF™ series, Daylight Solutions). The lasers have a nominal bandwidth of better than 0.0002 cm$^{-1}$, maximum power of 75 mW, and are capable of continuous tuning over a frequency range of at least 25 cm$^{-1}$. While QCL resolution is near 0.0002 cm$^{-1}$, the accuracy and reproducibility of the frequency are only on the order of 0.01 cm$^{-1}$.

A reference cell containing a low-finesse etalon and a reference cavity containing N$_2$O as reference gas at 1 torr was used to demarcate the QCL frequency. A frequency calibration was generated by assigning the discrete N$_2$O line features in the reference spectrum to the known rotational frequencies (Table 1) and interpolating the intermediate frequencies. The reference beam was generated when the primary QCL beam was passed through a zinc selenide (ZnSe) window (WG70530-1G, ThorLabs) held at 45° with respect to the beam line. The first surface of the ZnSe window was uncoated and the second surface was anti-reflection (AR) coated. This window split the primary beam into a reflected reference beam with approximately 10% of the primary beam power and a displaced sample beam (~90% power).

The reference cell was of 316 stainless-steel construction, 50 mm pathlength, ZnSe windows and Kalrez® 6375 O-rings. The first window was AR coated on both sides (WG70530-G, ThorLabs) and the second is uncoated (WG70530, ThorLabs). The uncoated window acted as the low finesse etalon. The intensity of the reference beam was measured by focusing it onto a mercury cadmium telluride (MCT) detector (PV1-3TE, 10.6 PIP-DC-FM4, Vigo Systems) with a 25.4 mm focal length lens (LA7542-G, ThorLabs). This MCT detector was a low-noise photo-voltaic device with MHz frequency response.

The sample beam passed through a low-volume folded-path gas cell. The sample cell was of 316 stainless-steel construction, ZnSe windows (WG71050-G, ThorLabs) and Kalrez® 6375 O-rings. The sample cell cavity was 100 mm long with a rectangular cross-section 3 mm wide by 20 mm tall and was tilted with respect to the beam at an angle α(0.54°). The folded path was created by discrete gold micro-mirrors deposited on the ZnSe windows to guarantee the beam was restricted to a single path. The micro-mirrors were 0.5 mm tall and 3 mm wide.

The gold micro-mirrors were deposited on the windows by plasma deposition using a mask manufactured by Photo Sciences Inc. The first and second micro-mirror windows were identical but oriented so the k=1 mirror is the first reflector for window #2 and the k=$(N_p-1)/2$ mirror is the first reflector for window #1.

The intensity of the sample beam exiting the sample cell was measured by focusing it onto a second MCT detector after passing through a 1 mm diameter aperture.

The cell had three welded gas ports (¼" VCR, Swagelok®). Two ports were available for connection to a gas manifold using convoluted metal tubing (CT Series, Swagelok®) and one port was connected to a pressure sensor (PX409-015AUSBH, Omega™). All plumbing connections and tubing were 304/316SS Swagelok® VCR fittings, and all O-ring seals were Kalrez® for material compatibility with uranium hexafluoride.

A cold trap was part of the gas manifold to allow for UF$_6$ purification by fractional sublimation. A typical purification cycle lasted 30 minutes. The purified sample was reintroduced into the manifold by closing the vacuum isolation valve and allowing the cold trap to warm to room temperature. The final target pressure in the multi-pass sample cell was 50 torr.

To generate a transmission spectrum, the QCL frequency was scanned over a 25 cm$^{-1}$ range at a set rate of 2.5 cm$^{-1}$/sec. Light transmitted through the sample and reference cells was simultaneously measured at 10 kHz frequency. QCL scanning was controlled through Daylight Solutions SideKick™ GUI. The QCL controller triggered the MCT detector readouts at the start of scan. The detectors were read using a Measurement Platform consisting of custom electronics hardware. This hardware could control the laser trigger, data collection and storage, data processing, and the displaying of the results. The software was developed to initiate data acquisition upon triggering from the QCL and transfer the data to a computer via USB for processing. The processing features included a 400 MHz processor, 16-bit analog-to-digital converter (ADC), two differential simultaneous sampling channels, 1 ns sample time accuracy, programmable gains, EEPROM, and 16 MB SDRAM. These features allowed for low electronic noise (8.3 μV), 1 M samples/sec readings, and data storage. A Visual Basic program (HPIR-1B) configured the readout electronics and accepted the reference and sample voltage readings. The HPIR-1B program wrote the sample and reference arrays to an Excel® spreadsheet (HPIR-Process) for automatic data processing, analysis, and archiving using Excel® Macros. A typical acquisition and transfer time was 32 seconds/scan. The electronics hardware also included multiple interfaces (2× configurable 10 s, 2× PT100 RTD sensors, 2× Pressure sensors, 2×MCT IR sensors) for temperature, pressure, and MCT detector control and readouts. The electronic system could be powered with a 12 V battery, enhancing the portability of the overall measurement system.

To control the Measurement Platform, a companion program was written for the controller computer which sets scan parameters and facilitated the offloading of the scan data into a spreadsheet, where the recorded output was processed to display spectra. Given the two systems working together, the scan process was as follows:

TABLE 2

| | |
|---|---|
| 1. Scan is initiated on controller computer. The "Start Scan" command contains all needed scan parameters. | 6. After completion of the scan, the Platform adjusts values based on system-specific offsets and formats the data for transfer. |
| 2. The Measurement Platform receives the scan parameters and sends "ready" signal to laser. | 7. The Platform offloads all data to the controller computer. |
| 3. The laser prepares and starts scan. | 8. After receipt, the companion program de-formats the data, converting it to decimal numbers. |
| 4. Once the first target wavenumber of the scan is reached, the laser sends a signal to the Measurement Platform. | 9. All data is transferred to a pre-formatted macro-enabled spreadsheet. |
| 5. The Measurement Platform starts simultaneous differential measurement recordings across the two IR detectors. | 10. The receiving spreadsheet runs calculations on the raw received data, displaying a spectrum. |

All uranium hexafluoride samples were measured at 50 Torr+/−10. The known pedigrees and isotopic content confirmatory tests are listed in Table 3, below. All $UF_6$ measurements were performed at a $UF_6$ test loop specifically designed for compatibility and the safety protocols relevant to handling $UF_6$ gas.

TABLE 3

| Material | $^{235}U$ wt % | $^{234}U$ wt % | $^{236}U$ wt % | $^{238}U$ wt % |
|---|---|---|---|---|
| Depleted $UF_6$ | 0.2869 | 0.0013 | NA | 99.7106 |
| Natural $UF_6$ | 0.7107 | 0.0054 | NA | 99.22839 |
| Low Enriched $UF_6$ | 1.5435 | 0.00674 | 0.00107 | 98.4487 |
| Low Enriched $UF_6$ | 3.214 | 0.020 | NA | 96.765 |
| Low Enriched $UF_6$ | 4.6178 | 0.0189 | 0.0426 | 95.3207 |
| | 4.6138 | 0.0192 | 0.0423 | 95.3247 |
| | 4.6148 | 0.0193 | 0.0427 | 95.3232 |
| Low Enriched $UF_6$ | 5.3480 | 0.0431 | 0.0063 | 94.6026 |
| Low Enriched $UF_6$ | 9.037 | 0.0840 | 0.0750 | 90.804 |
| Low Enriched $UF_6$ | 18.5062 | 0.1432 | 0.0233 | 81.3273 |
| Enriched $UF_6$ | 38.103 | — | — | 61.897 |
| Very High Enriched | 90.7090 | 0.8577 | 0.0215 | 8.4118 |
| | 90.7105 | 0.85519 | 0.0212 | 8.4123 |
| Very High Enriched | 91.7503 | 0.7050 | 0.1135 | 7.4310 |
| Very High Enriched | 93.7020 | 0.5859 | 0.3611 | 5.3510 |
| | 93.750 | 0.591 | 0.3612 | 5.302 |

The frequency calibration of the reference spectra was performed by assigning the known frequencies of $N_2O$ lines to corresponding channel positions of absorbance peaks measured in the reference cell of the system. A list of the $N_2O$ rovibrational lines used for calibration is shown in Table 1, above.

Absorbance line channel locations in the reference spectrum were identified by examining the slope and curvature of the spectral signal. Quadratic spline fit coefficients were calculated for each channel number over a given range of channels and sharp absorbance signals were identified through examination of the first and second order coefficients, which are related to the slope and curvature of the spectral signal. The range of channels was chosen to match the half-width of the $N_2O$ lines (about 7 channels). The spline fit coefficients were computed in the Excel® macro "SplineFit".

Sharp absorbance peak locations were identified at first derivative zero crossings, which were identified using the $C_1$ channel coefficients, by searching for values $C_1(n)>0$ where $C_1(n+1)<0$ A peak channel value was assigned as $[m-C_1(m)/(2*C_2(m))]$ where m is the integer that gives a local minimum of $|C_{24}(m)|$ for $\{m|\, n, n+1\}$.

The peak channel values were determined and frequencies were assigned in the Excel® macro "Peak_Find". Rovibrational peak assignment resulted in a table of discrete channel values and their frequencies. Full channel-to-frequency assignment was by linear interpolation:

$f(n)=Fi+(Fj-Fi)/(j-i)*(n-i) \ \{n|i<n<j\}$ in which:
f(n) was the frequency at channel n,
i and j were channel numbers assigned to adjacent rovibrational lines, and
Fi and Fj were the known rovibrational frequencies.

Figure 6:
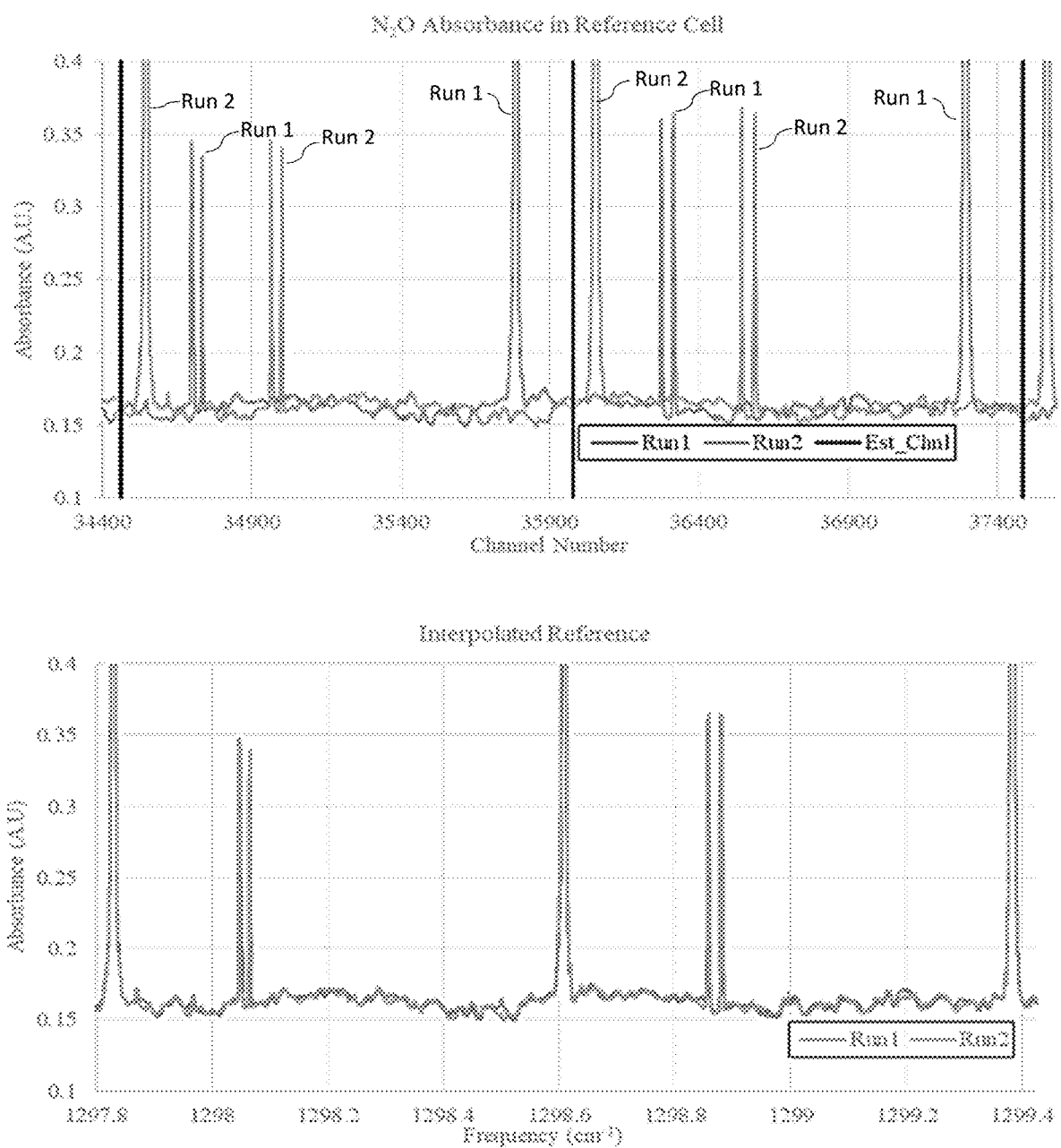
FIG. 6 provides the nitrous oxide ($N_2O$) reference spectra of two runs of a system as described before (upper graph) and after (lower graph) frequency calibration of the reference spectra to a common frequency scale.

The upper scan in FIG. 6 shows two reference spectra as collected, and the lower scan shows the reference spectra after interpolation.

With each channel assigned a frequency value by processing the reference spectrum, the sample spectrum was quadratically interpolated to uniform and evenly spaced frequency values using the Excel® macro "Interpolate" using the set of $C_k$ coefficients previously calculated. Operations performed on interpolated spectra included Fourier filtering, blank subtraction, mean centering and signal normalization. Because sample spectra were processed using fast-Fourier algorithms, the number of points in the interpolated spectrum was chosen to be an integer power of 2 (65536 points). Fourier filtering was used to suppress interference and etaloning effects found in sample spectra. The processing sequence was Fourier transformation, high-frequency suppression (Fourier coefficients N>23 set to zero), and inverse-Fourier transformation of the suppressed data.

Figure 7:
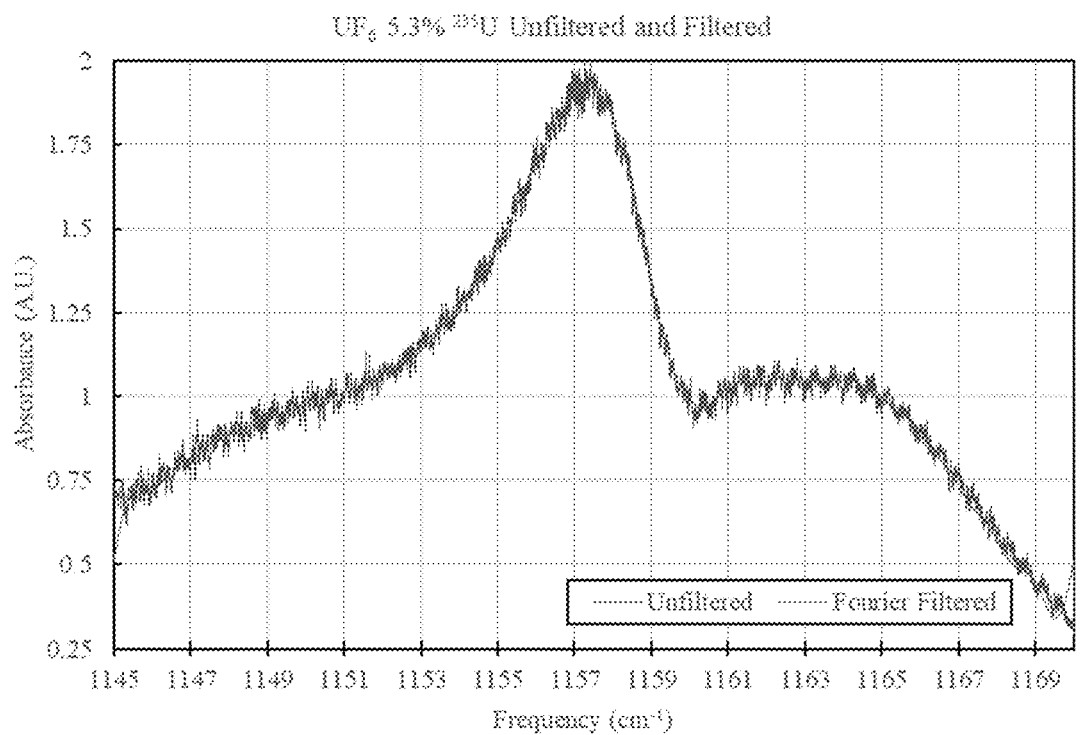
FIG. 7 provides uranium hexafluoride ($UF_6$) absorbance spectrum before (uneven line) and after (smooth line) Fourier filtering.

FIG. 7 shows the typical effect of the Fourier processing. Blank spectra were collected when the sample cell was under vacuum, just before sample was introduced and were Fourier processed in the same way as $UF_6$ sample spectra. Blank subtracted sample spectra were mean centered and normalized between 1155 $cm^{-1}$ and 1162 $cm^{-1}$ to correct for minor pressure variations in sample loading.

Figure 9:
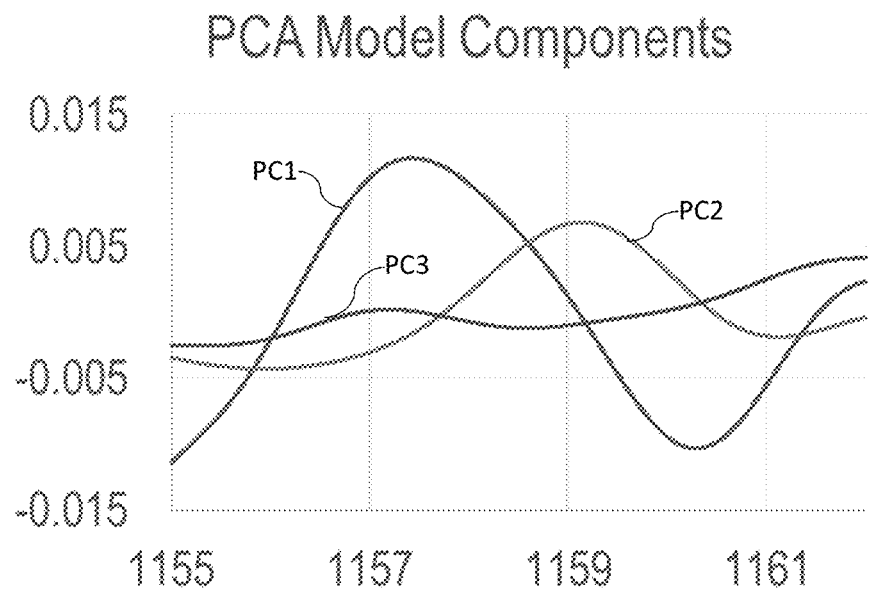
FIG. 9 presents a graph of the first three principal components obtained following processing of $UF_6$ absorbance spectral data as described herein.

Following processing, a subset of the processed data was analyzed by principal component regression using the known Excel® macro "Build_PCR". The analysis identified three significant components, shown in FIG. 9.

The $^{235}U$ content was computed from the processed spectrum as follows:

$[^{235}U]=K_0+K_1*[\{PC_1\}*\{S\}]+K_2*[\{PC_2\}*\{S\}]+K_3*[\{PC_3\}*\{S\}]$ in which:

$K_0$, $K_1$, $K_2$ and $K_3$ are the principal value leverages computed from the PCR model;

$\{PC_1\}$, $\{PC_2\}$, $\{PC_3\}$ are the principal component vectors;

$\{S\}$ is the processed spectrum vector; and $[\{PC_i\}*\{S\}]$ is the vector dot product.

After integration of the Measurement Platform with the HPIR system, analytical measurements were conducted to test performance. Two $UF_6$ samples were produced, one approximately 19% $^{235}U$ and the other approximately 60% $^{235}U$. A third "new" sample was legacy material estimated at 1.6% $^{235}U$ according to the container label. The three samples were submitted for mass spectroscopic analysis to confirm the actual isotopic content.

Figure 10:
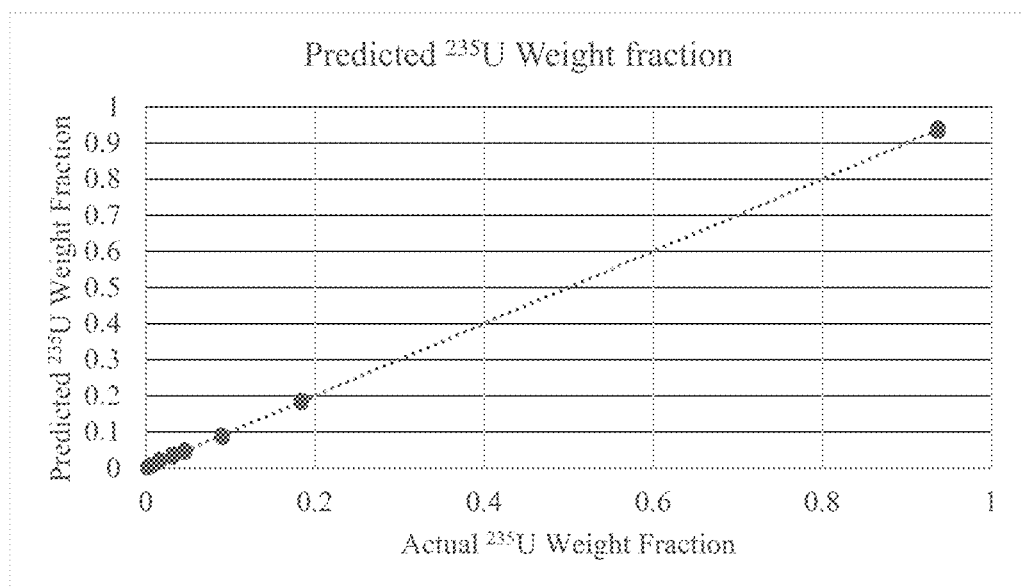
FIG. 10 presents a calibration curve of actual $^{235}U$ weight fractions of samples as determined by mass spectrometry compared to predicted values as determined by systems and methods described herein.

A calibration curve was built using eight of the nine $UF_6$ standards spanning an isotopic content range of depleted to highly-enriched uranium, as shown in FIG. 10. Each sample was measured at least 10 times, 20 measurements for depleted. The calibration curve initially showed the three new samples were not predicted to match the estimated values given. The ~19% and ~60% samples were predicted to be ~18.5% and ~38%, respectively. Due to the large discrepancy in the HPIR predicted value and the original estimate for the sample, the 38% sample was removed from the calibration curve. Upon mass spectrometric evaluation, the samples were shown to have actual values of 18.5251% and 38.103%. Therefore, the HPIR system correctly predicted the values before the actual value was known. The standard error of prediction of the data set was 0.0015 weight fraction, the slope of the calibration line was 0.99998, and the intercept of the calibration line was 0.000003 weight fraction. The 1.6% sample was predicted as 2.76% by the HPIR measurements, but the mass spectrometric data was still unavailable to confirm.

Figure 11:
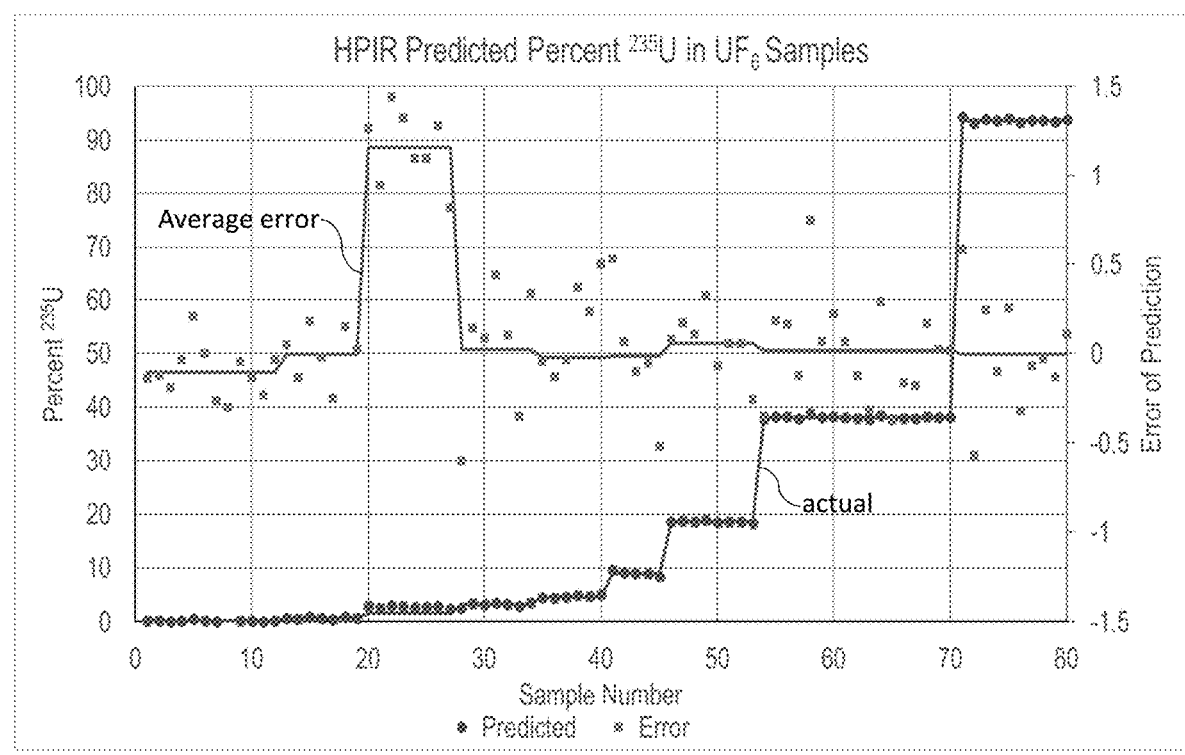
FIG. 11 compares actual mass spectrometric data with predicted mass spectrometric data.

In FIG. 11, the mass spectrometric (actual-line) and HPIR (predicted-round dots) measurements are plotted to demonstrate the accuracy of the HPIR predictions. As mentioned above, the 1.6% sample was not predicting the "actual" value and shows the highest error values. All other 8 samples predicted accurately with an average standard deviation of 0.25%. Table 1 summarizes the HPIR predictions and compares to the actual values (mass spectrometric). The average measurement time per sample was ~5 min for 10 scans. Increasing the measurement time 10-fold, improves the sensitivity by 3.2 times, as demonstrated in FIG. 8 when comparing the average error (purple line) to the individual measurement uncertainty values (red dots). Therefore, the sensitivity can theoretically be improved by increasing the number of measurements per sample to a finite extent and would depend on what is practical for a measurement at a facility.

Table 4, below, compares the HPIR results to the IAEA's International Target Values (ITVs).

TABLE 4

| Sample No. | Mass spec. $^{235}U$ % wt. | HPIR $^{235}U$ % wt. | HPIR st. dev. | HPIR % relative[i] | IAEA ITV NDA % relative[1] | IAEA IT DA % relative[1] |
| --- | --- | --- | --- | --- | --- | --- |
| 1 | 0.2869 | 0.18* | 0.14 | 22 | 22 | 0.70 |
| 2 | 0.7107 | 0.71 | 0.15 | 8.1 | 105.8 | 0.28 |
| 3 | ~1.6 | 2.76 | 0.21 | 2.7 | 5.8 | 0.14 |
| 4 | 3.2140 | 3.24 | 0.37 | 4.3 | 5.8 | 0.14 |
| 5 | 4.6178 | 4.59 | 0.52 | 4.6 | 5.8 | 0.14 |
| 6 | 9.0370 | 9.02 | 0.38 | 1.9 | 5.8 | 0.14 |
| 7 | 18.5251 | 18.58 | 0.17 | 0.32 | 5.8 | 0.14 |
| 8 | 38.103 | 38.12* | 0.28 | 0.18 | 3.2 | 0.07 |
| 9 | 93.7020 | 93.70 | 0.32 | 0.11 | 3.2 | 0.07 |

[1]International Atomic Agency. "STR-368: International Target Values 2010 for Measurement Uncertainties in Safeguarding Nuclear Materials." Nov. 2010.
[i]Relative % equation: relative % = [(HPIR Standard Deviation)/(Mass Spec 235U % Weight)]*100%.
*An average of 20 samples.

As shown in Table 4, the HPIR percent relative values fell between the ITVs for nondestructive analysis (NDA, radiometric) and destructive analysis (DA, mass spectrometry). Although the HPIR technique is considered destructive by the IAEA definition, the sample is not destroyed during analysis. Therefore, the HPIR system could be used for onsite, real-time detection at greater sensitivity than the NDA analytical techniques.

The example also demonstrated the Measurement Platform successfully controlled the data acquisition and off-loading of the data into a spreadsheet for processing. Due to the unique features provided by the electronics, the measurement noise and drift were reduced in comparison to other data acquisition methods. Measurement reproducibility was improved and demonstrated by sampling over a two-day period with only one blank measurement needed for background correction. The depleted sample statistics were calculated using data collected on different days without a new background measurement demonstrating reliable day-to-day reproducibility. The 38% sample was measured twice in one day to demonstrate good reproducibility between scan sets. The increased precision in the measurements also showed significantly worse mode-hopping laser issues during experiments, but the laser issues did not affect the improvements.

While certain embodiments of the disclosed subject matter have been described using specific terms, such description is for illustrative purposes only, and it is to be understood that changes and variations may be made without departing from the spirit or scope of the subject matter.

What is claimed is:

1. A spectroscopy system comprising:

A tunable emission source;

a beam splitter in optical communication with the emission source, the beam splitter defining a reference path and a sample path;

a reference cell in the reference path, the reference cell comprising an etalon and a reference cavity;

a first detector located at a terminus of the reference path, the first detector being configured to detect an intensity of a reference beam and an absorption spectrum of a reference gas;

a multi-pass sample cell in the sample path, the multi-pass sample cell comprising an inlet for a gas sample;

a second detector located at a terminus of the sample path, the second detector being configured to detect a sample beam intensity and an absorption spectrum of a sample gas; and a processor in communication with the tunable emission source, the first detector and the second detector, the processor being configured to perform a frequency calibration based on the reference gas absorption spectrum and using that frequency calibration, perform an analysis of the sample gas absorption spectrum, the analysis providing information regarding an absorption band shift of the sample gas absorption spectrum as compared to a known absorption spectrum, the shift being related to an isotope content of a sample.

2. The system of claim 1, further comprising a cold trap, the cold trap being in fluid communication with the inlet for the gas sample.

3. The system of claim 2, wherein the cold trap is a fractional sublimation cold trap.

4. The system of claim 1, wherein the tunable emission source is configured to emit a narrow wavelength bandpass emission comprising an infrared spectrum.

5. The system of claim 1, wherein the emission source comprises a laser.

6. The system of claim 1, wherein the emission source comprises a quantum cascade laser.

7. The system of claim 1, wherein the etalon is a low finesse etalon.

8. The system of claim 1, wherein the reference cavity contains the reference gas.

9. The system of claim 8, wherein the reference gas comprises nitrous oxide.

10. The system of claim 1, the multi-pass sample cell comprising
a first series of reflectors at a first end of the sample cell, the reflectors of the first series being spaced apart from one another and aligned with one another on the first end, each reflector of the first series comprising a planar reflection face; and
a second series of reflectors at a second end of the sample cell, the reflectors of the second series being spaced apart from one another and aligned with one another on the second end, each reflector of the second series comprising a planar reflection face.

11. A method for isotope analysis of a sample, the method comprising:
splitting an emission beam to form a reference beam and a sample beam;
directing the reference beam through an etalon;
directing the reference beam through a reference cavity containing a reference gas;
following the directing of the reference beam through the etalon and the reference cavity, impinging the reference beam on a first detector, the first detector detecting a reference beam intensity and a reference gas absorption spectrum;
processing the reference gas absorption spectrum to carry out a frequency calibration, the frequency calibration generating a common frequency scale;
directing the sample beam through a multi-pass sample cell containing a sample gas;
following the directing of the sample beam through the multi-pass sample cell, impinging the sample beam on a second detector, the second detector detecting a sample beam intensity and a sample gas absorption spectrum; and
processing the sample gas absorption spectrum by use of the common frequency scale, the processing determining an absorbance band shift of the sample gas absorption spectrum as compared to a known absorption spectrum, the processing further comprising analyzing the absorbance band shift to determine an isotope content of the sample gas.

12. The method of claim 11, the sample gas comprising uranium.

13. The method of claim 11, the reference gas comprising nitrous oxide.

14. The method of claim 11, further comprising purifying an initial sample gas to form the sample gas.

15. The method of claim 14, the purification comprising fractional sublimation.

16. The method of claim 11, the step of carrying out a frequency calibration comprising assigning known frequency absorption lines of the reference gas to corresponding channel positions of absorbance peaks of the reference gas absorption spectrum.

17. The method of claim 11, the step of processing the sample gas absorption spectrum comprising interpolating the sample gas absorption spectrum to the common frequency scale.

18. The method of claim 17, further comprising processing the interpolated sample gas absorption spectra according to one or more of Fourier filtering, blank subtraction, spectra smoothing, mean centering, and signal normalization.

19. The method of claim 18, the step of Fourier filtering comprising Fourier transformation, high frequency transformation, and inverse-Fourier transformation.

20. The method of claim 17, the step of analyzing the absorbance band shift comprising a principal component regression to determine the contribution of one or more isotopes of the sample gas to the absorbance band shift.

* * * * *